United States Patent [19]
Bryans et al.

[11] 4,100,732
[45] Jul. 18, 1978

[54] CENTRIFUGAL COMPRESSOR ADVANCED DUMP DIFFUSER

[75] Inventors: Alexander Connor Bryans, Reading; Barry Weinstein, Georgetown; Neil Roger Brookes, Topsfield; John William Vdoviak, Marblehead, all of Mass.

[73] Assignee: General Electric Company, Lynn, Mass.

[21] Appl. No.: 746,974

[22] Filed: Dec. 2, 1976

[51] Int. Cl.² ............................................. F02C 3/08
[52] U.S. Cl. .................................. 60/39.36; 415/207; 415/219 C
[58] Field of Search ............... 60/39.01, 39.36, 39.37; 415/207, 211, 219 A, 219 C

[56] References Cited
U.S. PATENT DOCUMENTS

| 3,305,165 | 2/1967 | Gregory | 415/207 |
| 3,832,089 | 8/1974 | Moellman | 415/207 |
| 3,937,013 | 2/1976 | Aspinwall | 60/39.36 |

*Primary Examiner*—Louis J. Casaregola
*Attorney, Agent, or Firm*—Henry J. Policinski; Derek P. Lawrence

[57] ABSTRACT

Airflow exiting a centrifugal compressor is diffused in multiple shaped passages tangential to the compressor impeller dumped into a plenum to reduce its Mach number and then directed through deswirl vanes to the entrance of a combustor. Deswirl at reduced Mach number significantly reduces pressure losses resulting in reduced complexity and manufacturing cost for the diffuser deswirl system.

3 Claims, 3 Drawing Figures

CENTRIFUGAL COMPRESSOR ADVANCED DUMP DIFFUSER

The invention described herein was made in the course of or under a contract or subcontract thereunder or grant with the Department of the Army.

BACKGROUND OF THE INVENTION

The invention relates to a diffuser and, more particularly, to a diffuser for a gas turbine engine which delivers the flow from the impeller of a centrifugal compressor to the entrance of a combustor with significantly reduced pressure losses.

Centrifugal compressors generally include a rotating impeller arranged to accelerate and thereby increase the kinetic energy of the gas flowing therethrough. The diffuser is generally characterized by an annular space surrounding the impeller. The diffuser acts to decrease the velocity of fluid flow leaving the impeller and thereby increase its static pressure. Such diffusers may be of the vane or pipe variety. Both of these types have generally included a plurality of circumferentially spaced passages which tangentially converge to the annular space surrounding the impeller. These passages expand in area downstream of the impeller in order to diffuse the flow exiting the impeller. Diffusers of the vane type use a plurality of circumferentially spaced vane elements to form these passages such as disclosed in U.S. Pat. Nos. 3,460,748 issued to J. R. Erwin on Apr. 12, 1969 and 3,369,737 issued to J. R. Switzer et al. on Feb. 20, 1968, both assigned to the assignee of this invention. Alternatively, these passages may be formed as pipe elements between opposed plates as disclosed in U.S. Pat. No. 3,719,430 issued to L. W. Blair et al. on Mar. 6, 1973 and assigned to the assignee of this invention. Both vane and pipe type diffusers generally include a transition region downstream of the diffuser passages to match the diffuser flowpath to the combustor geometry. The transition region generally includes a deswirl section upstream of the entrance to the combustor to remove the circumferential swirl from the flow exiting the diffuser passages. In the diffuser of the Blair et al. patent this structure is characterized by a plurality of circumferentially spaced diffuser passages which gradually merge and exit into a transition region comprising an annular manifold. The manifold includes a plurality of circumferentially spaced apart deswirl vanes which act to cancel the residual circumferential velocity component of the flow exiting the diffuser passages. The flow exiting the deswirl vanes is directed to a combustion chamber.

While demonstrating significant improvements over the performance of prior centrifugal compressors for gas turbine engines, there remains room for improvement in the performance of the diffusers heretofore mentioned, particularly in the area of system pressure losses. In such prior art diffusers the flow exiting the diffuser passages remains at a relatively high velocity when it is deswirled by the deswirl vanes. Deswirl at such high Mach numbers causes a significant reduction in pressure in the flow entering the combustor. Further, flow at such high Mach numbers requires passages with small annulus heights and relatively high tolerances to be maintained in the manufacture of the transition region and the deswirl vanes disposed therein resulting in increased complexity and manufacturing costs for diffuser of the type disclosed in the Blair et al patent and other prior art diffusers which deswirl at relatively high Mach number.

OBJECT OF THE INVENTION

It is therefore the primary object of the present invention to provide a diffuser for a centrifugal compressor which is constructed to reduce pressure losses, complexity and manufacturing cost.

SUMMARY OF THE INVENTION

These and other objects of this invention have been achieved in the preferred embodiments of the invention wherein airflow exiting a centrifugal compressor is diffused in passages tangential to the compressor impeller. These passages are shaped to provide efficient pressure recovery and to approximate a continuous slot discharge. The low diffuser exit Mach numbers (for example, $\leq 0.3$) coupled with the low base area discharge from the diffuser results in low pressure losses as the airflow is dumped into a plenum to further reduce its Mach number. The reduced Mach number flow is then directed through a plurality of circumferentially spaced deswirl vanes disposed in a passage in flow communication with the entrance of a combustor. Deswirl at reduced Mach numbers, on the order of 0.15, significantly reduces diffuser pressure losses. Further, because of the lower pressure of the flow therethrough, the manufacturing tolerances for the deswirl vanes and the flowpath between the outlet of the tangential passages and the entrance to the combustor is significantly less critical than similar tolerances for the transition region of prior art diffusers. The reduced tolerances results in corresponding reductions in manufacturing cost and complexity for the diffuser of this invention. A further advantage of the diffuser of this invention is that the lower pressure of the flow in the plenum permits mid-frame service tubes to be located therethrough without significant performance penalties to the gas turbine engine. In the past, it has been the practice to locate such tubes downstream of the deswirl vanes in proximity to the entrance to the combustor. The location of these tubes upstream of the deswirl vanes was prohibitive because the relatively high Mach number of the flow at that point created excessive turbulence to the flow entering the combustor. However, location of such tubes in proximity to the combustor has caused undesirable wakes in the temperature distribution of gases exiting the combustor and wakes along the shell of the combustor which result in locally high metal temperatures. These latter undesirable effects have been accepted on the basis that they create less losses than would be experienced if the mid-frame service tubes were located within the high pressure stream of the gases exiting the tangential flow passages. However, the diffuser of this invention because of the reduced Mach number of the flow in the plenum permits mid-frame service tubes to be located upstream of the deswirl vanes without excessive turbulence and resulting losses therefrom. This in turn significantly reduces the effects of wakes on exit temperature distribution and shell temperatures of the combustor resulting in improved overall performance of a gas turbine engine incorporating the diffuser of this invention.

BRIEF DESCRIPTION OF THE DRAWINGS

The invention may be better understood upon reading the following description of the preferred embodiment in conjunction with the accompanying drawings in which.

DESCRIPTION OF THE PREFERRED EMBODIMENT

Figure 1:
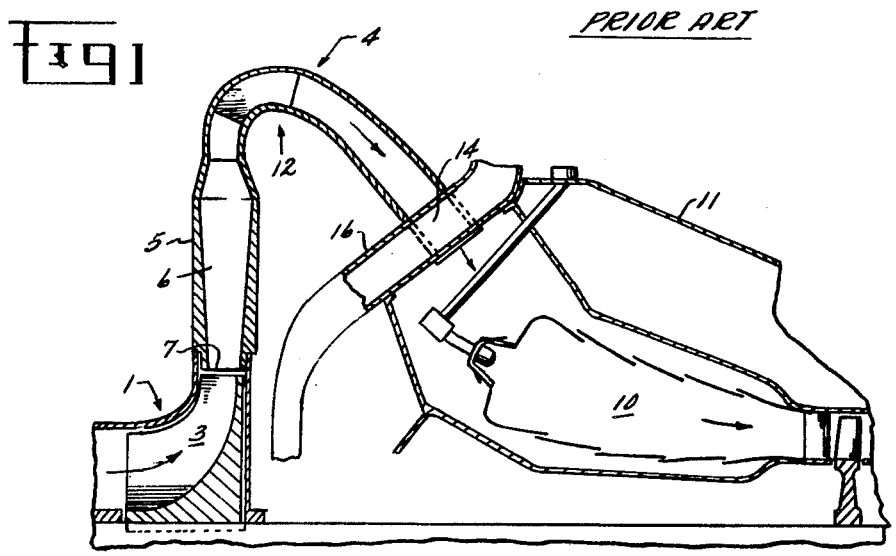
FIG. 1 is a cross-sectional view of a prior art diffuser for a centrifugal compressor of a gas turbine engine.

Referring to FIG. 1 there is shown a cross-sectional view of a prior art diffuser for a centrifugal compressor of a gas turbine engine wherein an impeller 1 is mounted for rotation about the engine center shaft (not shown). The impeller includes a plurality of blades 3 circumferentially supported in spaced relationship by a web (not shown). The diffuser shown generally at 4 includes an annular housing 5 having a plurality of passages 6 disposed therein each including an inlet 7 surrounding the outer tip of an impeller blade 3. The cross-sectional area of the passages 6 gradually widen in a radially outward direction to diffuse the gases flowing therethrough and thereby convert the high kinetic energy of these gases into static pressure energy. In order to provide low pressure losses to the plenum section, it is preferred that the diffuser outlet passages conform to the shape disclosed in U.S. patent application Ser. No. 639,232 filed on Dec. 10, 1975, by A. C. Bryans and assigned to the same assignee as this invention. In order to adapt the diffuser to the geometry of a combustor 10 within the engine casing 11 a transition section shown generally at 12 is provided upstream of the outlet of the diffuser passages 6. Transition section 12 includes a plurality of deswirl vanes 14 for removing undesirable swirl in the flow to the combustor 10. A plurality of engine service tubes 16, well known in the prior art, which provide for lubrication and venting of engine bearings are disposed downstream of the deswirl vanes 14 to permit servicing of the engine mid-frame area. As has been indicated, diffusers of this type while offering a significant improvement over prior diffusers have several disadvantages. One disadvantage is that such diffusers are relatively expensive to construct because of the small dimensions, smooth wall surfaces and tight tolerances required in the section of the diffuser intermediate the outlet of the diffuser passages 6 and the inlet to the combustor 10. Also significant pressure losses are experienced at the relatively high Mach numbers at which the flow from the diffuser outlet passages 6 impinge on the deswirl vanes 14. A further disadvantage of this prior art system is the location of the mid-frame service tubes 16 downstream of the deswirl vanes 14 in proximity to the inlet of the combustor 10. The location of the mid-frame service tubes in this area creates turbulence in the flow entering the combustor thereby causing wakes in the exit temperature distribution and wakes causing high local shell temperatures of the combustor 10.

Figure 2:
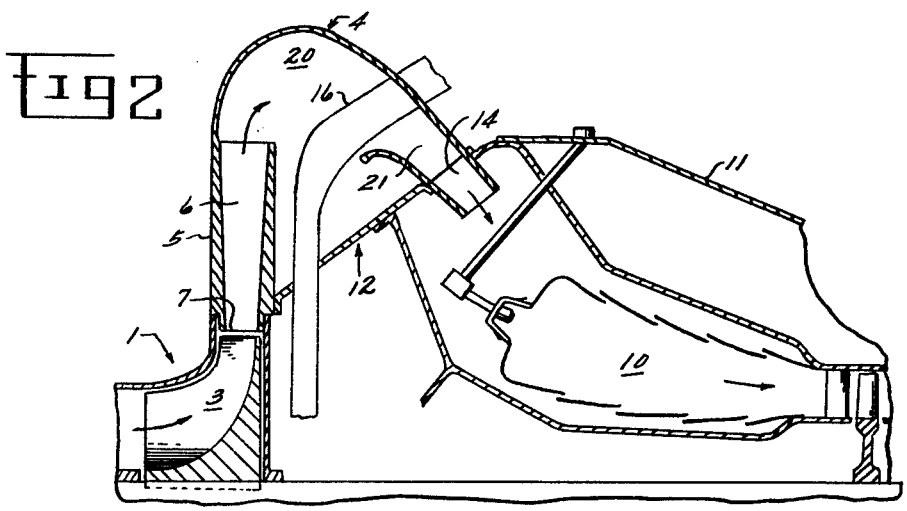
FIG. 2 is a cross-sectional view of the diffuser of this invention.
Figure 3:
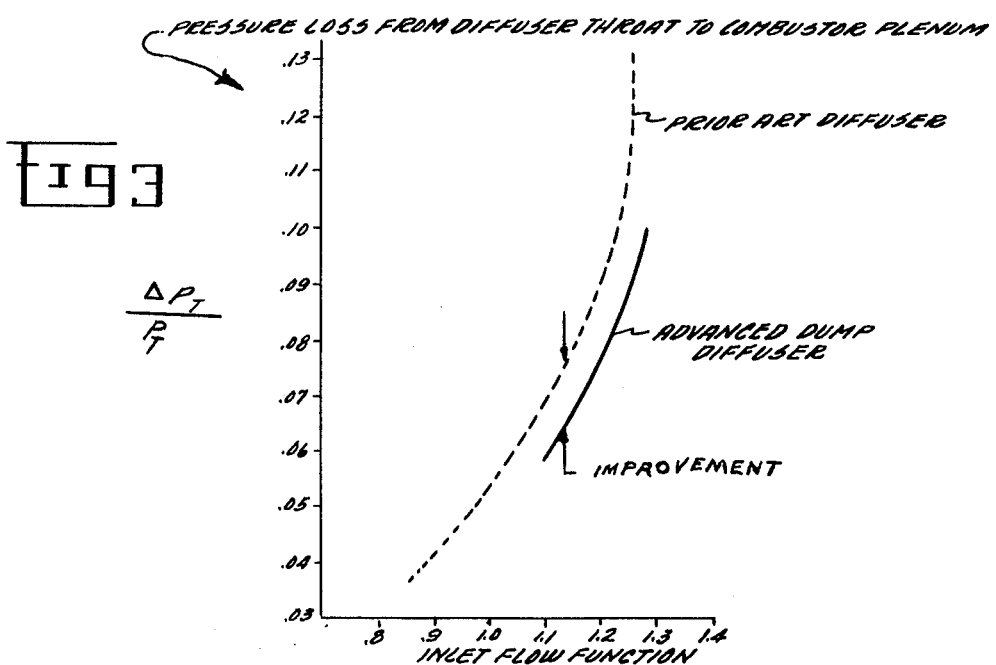
FIG. 3 is a graph illustrating the performance improvement of the diffuser of this invention.

Referring to FIG. 2 wherein like numbers refer to previously identified components therein is shown the advanced dump diffuser of this invention. As can be seen, a transition region comprising a plenum area shown generally at 20 is disposed at the outlet of the diffuser passages 6 to permit expansion of the diffuser flow and a reduction in its Mach number. The plenum area 20 terminates in a neck portion 21 in flow communication with the combustor 10 and has a plurality of deswirl vanes 14 disposed therein in order to remove any residual circumferential swirl of the flow entering the combustor 10. The reduced velocity of the flow created by the plenum 20 permits relocation of the mid-frame service tubes 16 through the plenum area 20 upstream of the deswirl vanes 14. This configuration results in a relatively low Mach number for the flow over the deswirl vanes and resultant decrease in pressure losses. An analysis of this system as compared to the prior art system of FIG. 1 reveals that overall system pressure loss can be reduced by as much as 1.5% which is equivalent to an increase of about 15 shaft horsepower for a turboshaft gas turbine engine. This phenomenon is illustrated in the graph of FIG. 3.

Deswirl at relatively low Mach number also permits less critical tolerances in the geometry of the plenum area 20, neck portion 21 and deswirl vanes 14. Relatively low velocity in the plenum area 20 also permits the mid-frame service tubes 16 to be located upstream of the deswirl vanes 14 thereby resulting in a more uniform flow entering the combustor and a corresponding reduction in wakes adversely affecting the exit temperature distribution of the flow exiting the combustor and of the shell temperature of the combustor.

While a preferred embodiment of the present invention has been depicted and described it will be understood that many modifications and changes may be made thereto without departing from the invention's fundamental theme. Thus, while the invention has been depicted as incorporated into a diffuser of the pipe variety it is equally applicable to diffuser of the vane type and to all prior art diffusers which deswirl at high Mach number.

Therefore having described a preferred embodiment of the invention, though not exhaustive of all possible equivalents, what is desired to be secured by Letters Patent of the United States is claimed below:

1. A diffuser for diffusing the accelerated gas flow from a centrifugal compressor to an annular combustor comprising:
    an annular housing circumscribing the centrifugal compressor;
    a plurality of diffuser passages spaced about the circumference of the housing and extending therethrough for diffusing the flow exiting the compressor;
    a transition region disposed intermediate the outlet of the diffuser passages and the inlet to the combustor said transition region further including a reduced area neck portion,
    plenum means disposed in said transition region upstream of said neck portion for expanding the gas flow exiting the diffuser passages and correspondingly reducing the velocity of said gas flow; and
    a plurality of circumferentially spaced deswirl vanes in said transition region upstream of the inlet to the combustor.

2. The diffuser of claim 1 wherein said circumferentially spaced deswirl vanes are disposed in said neck portion.

3. The diffuser of claim 2, wherein the said reduced velocity of the gas flow in the plenum area permits a plurality of circumferentially spaced engine service tubes to be disposed through said plenum area without the creation of excessive turbulence in the gas flow entering the combustor.

* * * * *